US007334700B2

(12) United States Patent
Hatsuno et al.

(10) Patent No.: US 7,334,700 B2
(45) Date of Patent: Feb. 26, 2008

(54) MEDICINE SUPPLYING APPARATUS

(75) Inventors: Akinori Hatsuno, Gunma-ken (JP); Atsuo Inamura, Ota (JP); Hideyuki Takahashi, Ota (JP)

(73) Assignees: Sanyo Electric Co., Ltd., Moriguchi-shi (JP); Sanyo Electric Biomedical Co., Ltd., Moriguchi-shi (JP)

( * ) Notice: Subject to any disclaimer, the term of this patent is extended or adjusted under 35 U.S.C. 154(b) by 100 days.

(21) Appl. No.: 11/177,571

(22) Filed: Jul. 11, 2005

(65) Prior Publication Data

US 2006/0016827 A1 Jan. 26, 2006

(30) Foreign Application Priority Data

Jul. 21, 2004 (JP) ............................ 2004-212697

(51) Int. Cl.
*B65G 59/00* (2006.01)

(52) U.S. Cl. ........................ 221/123; 221/92; 221/151; 221/208; 221/262

(58) Field of Classification Search .................. 221/65, 221/123; 700/231–244
See application file for complete search history.

(56) References Cited

U.S. PATENT DOCUMENTS

2004/0084512 A1 * 5/2004 Inamura .................. 229/87.01
2004/0134925 A1 * 7/2004 Inamura ...................... 221/13

FOREIGN PATENT DOCUMENTS

JP 2000-103402 4/2000

* cited by examiner

*Primary Examiner*—Gene O. Crawford
*Assistant Examiner*—Michael K Collins
(74) *Attorney, Agent, or Firm*—Kratz, Quintos & Hanson, LLP

(57) ABSTRACT

There is disclosed a medicine supplying apparatus which can effectively eliminate medicine clogging in a nozzle for releasing a medicine into a package paper or the like. The medicine supplying apparatus supplies the medicine discharged from a tablet case which contains the medicine, and comprises the nozzle for releasing the medicine discharged from the tablet case; a shutter which is rotatably disposed in the nozzle and which opens/closes a medicine falling passage in the nozzle; and a roller which is rotatably disposed facing the medicine falling passage in the nozzle. The roller is disposed in a position at a height facing the shutter, and rotates in conjunction with the opening/closing of the shutter.

8 Claims, 7 Drawing Sheets

MEDICINE SUPPLYING APPARATUS

TECHNICAL FIELD

The present invention relates to a medicine supplying apparatus for distributing a medicine contained in a tablet case into a package paper, a bottle or the like in a hospital, a dispensing pharmacy and the like.

BACKGROUND ART

In hospitals or dispensing pharmacies, medicines prescribed by doctors have heretofore been supplied to patients using medicine supplying apparatuses. In this method, medicines (tablets, capsules, etc.), whose quantities are described in a prescription, are discharged one by one from a discharging drum in a tablet case, collected in a hopper, and thereafter discharged into a half-folded package paper via a nozzle to package the medicines every pack (see, e.g., Japanese Patent Application Laid-Open No. 2000-103402).

Additionally, in the nozzle for releasing or injecting the medicine into the half-folded package paper, a shutter is disposed which opens/closes a medicine falling passage in the nozzle to control the injection of the medicine. On the other hand, the medicine falling passage in the nozzle is sometimes constituted in such a manner as to narrow an exit so that the medicine can be injected even into a package paper having a small depth (width). In this case, when medicines such as capsules having long dimensions are discharged, the nozzles are disadvantageously clogged with the medicines.

The present invention has been developed to solve the conventional technical problems, and an object is to provide a medicine supplying apparatus which can effectively prevent medicine clogging in nozzles for discharging medicines into a package paper and the like.

SUMMARY OF THE INVENTION

According to a first invention of the present application, there is provided a medicine supplying apparatus for supplying a medicine discharged from a tablet case which contains the medicine, comprising: a nozzle for releasing the medicine discharged from the tablet case; a shutter which is rotatably disposed in the nozzle and which opens/closes a medicine falling passage in the nozzle; and a roller which is rotatably disposed facing the medicine falling passage in the nozzle.

In a medicine supplying apparatus according to a second invention of the present application, in the above invention, the roller is disposed in a position at such a height that the roller faces the shutter, and the roller rotates in conjunction with the opening/closing of the shutter.

In a medicine supplying apparatus according to a third invention of the present application, in the first invention, the medicine falling passage in the nozzle is narrowed on an exit side, the roller is disposed in a position where the medicine falling passage narrows, and the roller rotates in conjunction with the opening/closing of the shutter.

In a medicine supplying apparatus according to a fourth invention of the present application, in each of the above-described inventions, a coefficient of friction of the surface of the roller is increased.

According to a fifth invention of the present application, there is provided a medicine supplying apparatus for supplying a medicine discharged from a tablet case which contains the medicine, comprising: a nozzle for releasing the medicine discharged from the tablet case; and a shutter which is rotatably disposed in the nozzle and which opens/closes a medicine falling passage in the nozzle, wherein the shutter extends from a driving shaft side to a wall surface of the nozzle facing the shutter to close the medicine falling passage in the nozzle, the shutter is rotated into a substantially hanging-down state to open the medicine falling passage, and the shutter is detached from the facing wall surface of the nozzle toward a lower end side in an opened state of the medicine falling passage.

According to a sixth invention of the present application, there is provided a medicine supplying apparatus for supplying a medicine discharged from a tablet case which contains the medicine, comprising: a nozzle for releasing the medicine discharged from the tablet case; and a shutter which is rotatably disposed in the nozzle and which opens/closes a medicine falling passage in the nozzle, wherein a lower end portion of the shutter extends obliquely downwards from a driving shaft side to close the medicine falling passage in the nozzle, the shutter is rotated into a substantially hanging-down state to open the medicine falling passage, and an upper end portion of the shutter is formed into such a shape that the medicine is urged downwards by the rotation for opening the shutter.

According to a seventh invention of the present application, there is provided a medicine supplying apparatus for supplying a medicine discharged from a tablet case which contains the medicine, comprising: a nozzle for releasing the medicine discharged from the tablet case; and a shutter which is rotatably disposed in the nozzle and which opens/closes a medicine falling passage in the nozzle, wherein the shutter extends from a driving shaft side to a wall surface of the nozzle facing the shutter to close the medicine falling passage in the nozzle, the shutter is rotated into a substantially hanging-down state to open the medicine falling passage, and a protruding portion extending toward the shutter is formed on the facing wall surface of the nozzle.

In the first invention, there is provided the medicine supplying apparatus for supplying the medicine discharged from the tablet case which contains the medicine, comprising: the nozzle for releasing the medicine discharged from the tablet case; the shutter which is rotatably disposed in the nozzle and which opens/closes the medicine falling passage in the nozzle; and the roller which is rotatably disposed facing the medicine falling passage in the nozzle. Therefore, when the nozzle is clogged with the medicine in a state in which the medicine abuts on the roller, a posture of the medicine can be changed by the rotation of the roller. Consequently, the nozzle is effectively inhibited from being clogged with the medicine so that the medicine can smoothly fall down.

Especially, as in the second invention, the roller is disposed in the position at such the height that the roller faces the shutter, and the roller is rotated in conjunction with the opening/closing of the shutter. In this case, when the medicine is bridged between the shutter and the roller, and stopped, the roller is rotated accompanying the opening of the shutter, so that the posture of the medicine is changed, and the bridged state is eliminated. Consequently, the medicine falls through the medicine falling passage in the opened nozzle without any trouble.

Moreover, in a case where the medicine falling passage in the nozzle is narrowed on the exit side, as in the third invention, the roller is disposed in the position where the medicine falling passage narrows, and the roller is rotated in conjunction with the opening/closing of the shutter. Accordingly, the shutter is opened, and the fallen medicine is stuck in a portion where the medicine falling passage in the nozzle narrows. In this case, the roller rotates in conjunction with an operation to close the shutter, so that the posture of the medicine is changed. Consequently, the medicine falls down from an exit of the nozzle without any trouble.

Furthermore, when the coefficient of friction of the surface of the roller is increased as in the fourth invention, the posture of the medicine, which abuts on the roller, can be securely changed by the rotation of the roller, and it is possible to further securely eliminate the clogging of the nozzle with the medicine.

In the fifth invention, there is provided the medicine supplying apparatus for supplying the medicine discharged from the tablet case which contains the medicine, comprising: the nozzle for releasing the medicine discharged from the tablet case; and the shutter which is rotatably disposed in the nozzle and which opens/closes the medicine falling passage in the nozzle, wherein the shutter extends from the driving shaft side to the facing wall surface of the nozzle to close the medicine falling passage in the nozzle, the shutter is rotated into the substantially hanging-down state to open the medicine falling passage, and the shutter is detached from the facing wall surface of the nozzle toward the lower end side in the opened state. Therefore, when the shutter is opened, the medicine falling passage broadens while extending downwards between the shutter and the wall surface of the nozzle facing the shutter.

Consequently, the medicine, which falls down through the medicine falling passage when the shutter is opened, is not easily stuck between the opened shutter and the facing nozzle wall surface.

In the sixth invention, there is provided the medicine supplying apparatus for supplying the medicine discharged from the tablet case which contains the medicine, comprising: the nozzle for releasing the medicine discharged from the tablet case; and the shutter which is rotatably disposed in the nozzle and which opens/closes the medicine falling passage in the nozzle, wherein the lower end portion of the shutter extends obliquely downwards from the driving shaft side to close the medicine falling passage in the nozzle, the shutter is rotated into the substantially hanging-down state to open the medicine falling passage, and the upper end portion of the shutter is formed into such the shape that the medicine is urged downwards by the rotation for opening the shutter. Therefore, in a case where the medicine is bridged and stopped between the upper end portion of the shutter and the wall surface of the nozzle in the state in which the shutter is closed, the medicine is urged downwards by the upper end portion of the shutter accompanying the opening of the shutter, and the posture of the medicine is changed to eliminate the bridged state. Consequently, the medicine falls down through the medicine falling passage in the nozzle via the opened shutter without any trouble, and the clogging of the nozzle with the medicine is eliminated.

In the-seventh invention, there is provided the medicine supplying apparatus for supplying the medicine discharged from the tablet case which contains the medicine, comprising: the nozzle for releasing the medicine discharged from the tablet case; and the shutter which is rotatably disposed in the nozzle and which opens/closes the medicine falling passage in the nozzle, wherein the shutter extends from the driving shaft side to the facing wall surface of the nozzle to close the medicine falling passage in the nozzle, the shutter is rotated into the substantially hanging-down state to open the medicine falling passage, and the protruding portion extending toward the shutter side is formed on the facing nozzle wall surface. Therefore, when the shutter is closed, and the medicine is bridged and stopped between the protruding portion and the shutter, the medicine falls down from the shutter side accompanying the opening of the shutter. Consequently, the posture of the medicine is changed, and the medicine falls down through the medicine falling passage in the nozzle via the opened shutter without any trouble. Therefore, the medicine clogging in the nozzle is prevented.

DETAILED DESCRIPTION OF THE EMBODIMENTS

Embodiments of the present invention will be described hereinafter in detail with reference to the drawings.

Embodiment 1

Figure 1:
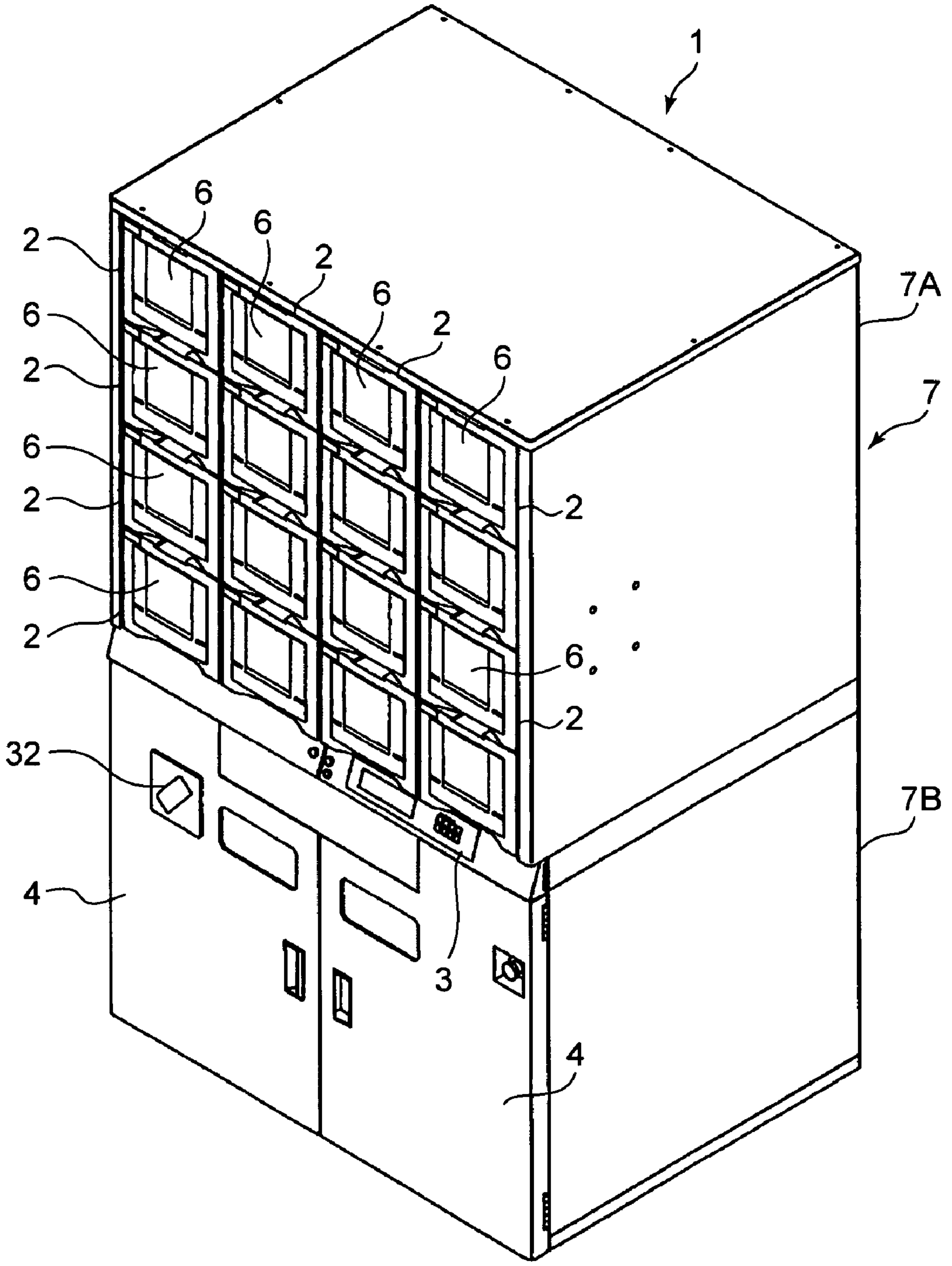
FIG. 1 is a perspective view of a medicine supplying apparatus according to a first embodiment of the present invention.
Figure 2:
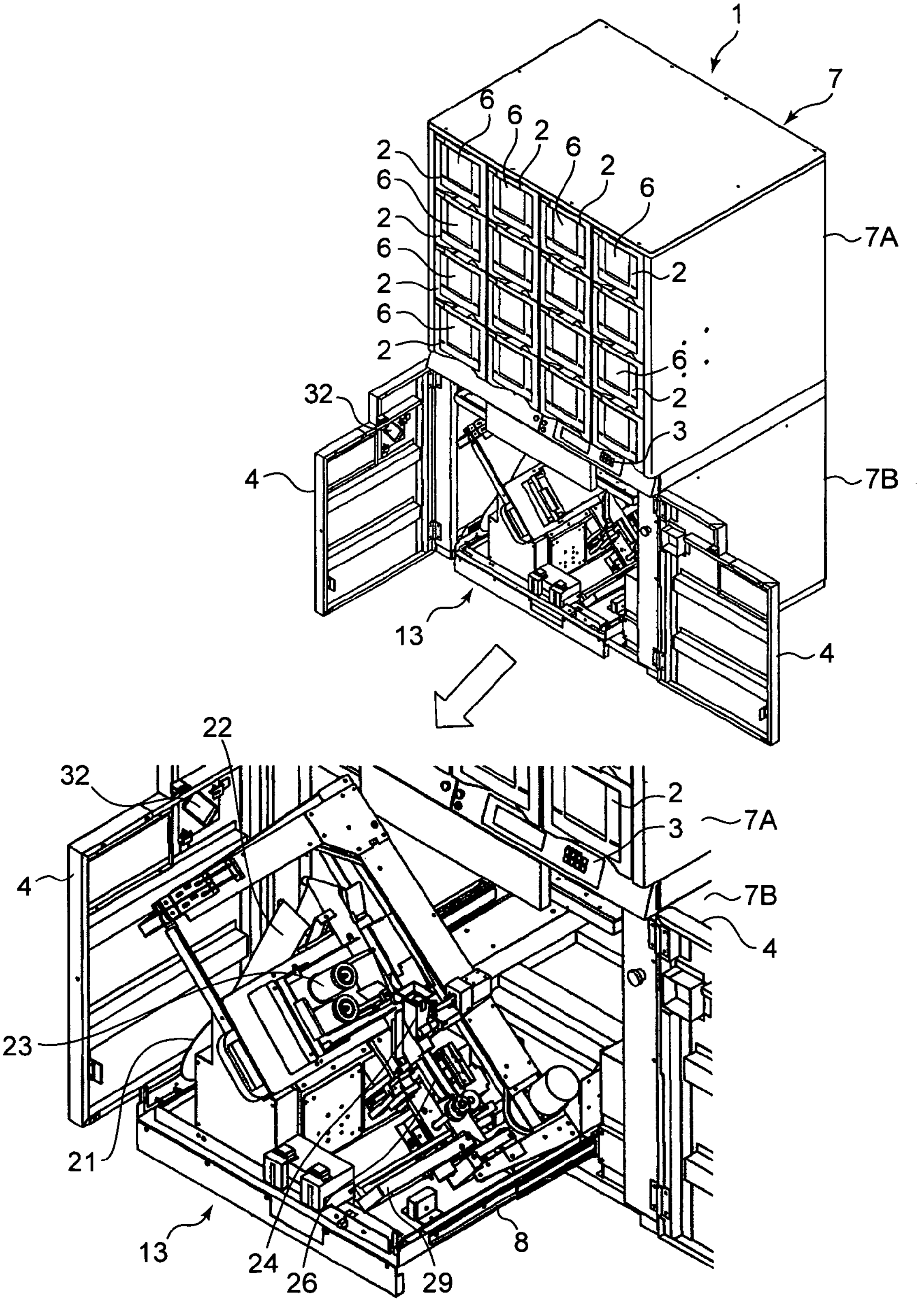
FIG. 2 is a perspective view of the medicine supplying apparatus of FIG. 1 in a state in which a lower panel is opened.
Figure 3:
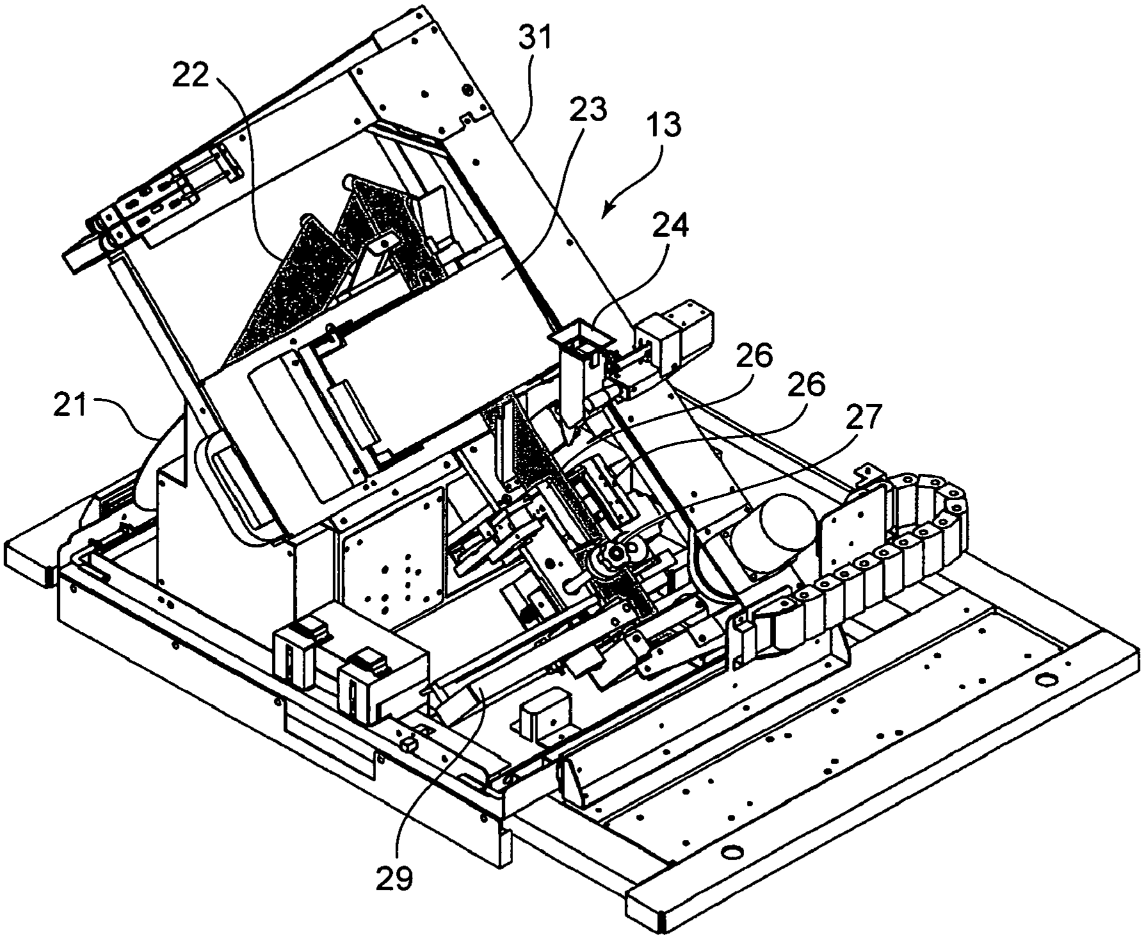
FIG. 3 is a perspective view of a packaging machine of the medicine supplying apparatus shown in FIG. 1.

FIG. 1 is a perspective view of a medicine supplying apparatus 1 according to one embodiment of the present invention; FIG. 2 is a perspective view of the medicine supplying apparatus 1 in a state in which lower panels 4 are opened; and FIG. 3 is a perspective view of a packaging machine 13 of the medicine supplying apparatus 1.

In this embodiment, the medicine supplying apparatus 1 is installed in a hospital, a dispensing pharmacy or the like, and is constituted of a main body 7 having a vertically long rectangular shape, a personal computer for control described later and the like. For example, the main body 7 includes an upper structure 7A and a lower structure 7B which can be separated from each other, and has a structure in which the upper structure 7A is stacked on and connected to the lower structure 7B. Moreover, in the upper structure 7A, a case storing section is disposed which contains tablet cases (not shown) containing medicines and whose front and lower portions are opened.

Moreover, front and upper surfaces of the lower structure 7B are opened, and the lower structure communicates with the upper structure 7A via the upper surface of the lower structure. Furthermore, in the lower structure 7B, the packaging machine 13 or the like is stored/installed as a charging device described later, and an opening in the front surface is openably closed by double-door type lower panels 4, 4.

In the case storing section in the upper structure 7A, shelves 2 . . . (16 shelves in total) are arranged horizontally in four rows and vertically in four stages. Door panels 6 are attached to front ends of the respective shelves 2. In a state in which all of the shelves 2 . . . are stored in the case storing section, the respective door panels 6 . . . close the front-surface opening in the upper structure 7A. In a middle of the shelf 2, a passage, whose upper and lower portions are opened, is formed in such a manner as to extend forwards/backwards. On opposite sides of the passage, a plurality of tablet cases are arranged and attached in a forward/backward direction.

It is to be noted that the tablet case (not shown) is constituted of a driving base disposed on the shelf 2, and a detachable storage connected onto the base. A drum motor and an optical medicine detecting sensor are attached to the inside of the driving base of the tablet case, and a discharging chute is formed in the base. Moreover, this discharging chute communicates with and opens into the passage of the shelf 2. In FIG. 1, reference numeral 3 denotes a control panel.

An upper surface of the storage of the tablet case (not shown) is opened, and the opening is closed by an openable lid. A discharging drum is attached to an inner bottom portion of the storage, and a plurality of vertical grooves are formed at predetermined intervals around a side surface of the discharging drum. The discharging drum is rotated by the drum motor, and the medicines are discharged one by one from the discharging chute to the passage of the shelf 2. The discharged medicine is detected and counted by the medicine detecting sensor.

Moreover, in a state in which the respective shelves 2 . . . are contained in the case storing section of the upper structure 7A, the passages of the respective vertically positioned shelves 2 . . . are connected to one another to constitute a series of chutes which vertically communicate with one another. Therefore, in the embodiment, four rows of chutes each extending vertically are horizontally arranged in the upper structure 7A.

On the other hand, as described above, the packaging machine 13 (charging device) is stored in the lower structure 7B of the main body 7. A structure of the packaging machine 13 will be described later in detail. Since drawing rails 8 are attached to bottom portions of the packaging machine 13 on opposite sides as shown in a lower part of FIG. 2, the packaging machine 13 can be drawn forwards from the lower structure 7B by the rails in a state in which the lower panels 4, 4 are opened.

In an upper part of the lower structure 7B, two primary shutters (not shown) are disposed side by side. Each shutter faces a lower portion of each chute in the upper structure 7A disposed above the shutter. Moreover, the shutter fulfils a function of once receiving the medicine which falls down into a hopper (not shown) disposed under the shutter as described later. Moreover, each hopper, corresponding to the lower portion of each shutter, is disposed in the lower structure 7B. This hopper has a rectangular funnel shape whose upper surface is broadly opened and which is tapered toward a lower end of the hopper. The hopper receives the medicine falling from each chute through the shutter, and discharges the medicine from a lower-end opening.

Next, a constitution of the packaging machine 13 will be described with reference to FIG. 3. Reference numeral 21 denotes a roll around which a thermally fusable package paper 22 (constituting a container) is wound, 23 denotes a printer, 24 denotes a nozzle attached to a lower-end opening of the hopper, 26 denotes thermal seal heads formed of silicon rubbers, 27 denotes a roller which conveys the package paper 22 drawn from the roll 21, and 29 denotes a cutter which cuts the package paper 22. Reference numeral 31 denotes a conveyer which conveys the divided and cut package paper 22 to a take-out port 32 (FIG. 1) disposed in the lower panel 4, and the conveyors are successively arranged along a conveying path of the package paper 22.

The package paper 22 wound around the roll 21 has a substantially V-shaped section whose upper surface is opened and which is folded (half folded) by the lower end, and the paper is once drawn from the roll 21 obliquely in an upper right direction by the roller 27 or the like, and further drawn obliquely in a lower right direction (as one faces the figure). Thereafter, the surface of the paper is printed by the printer 23 as described later. Next, the medicine discharged from the nozzle 24 is injected into the package paper 22, and the package paper 22 is comparted every pack by the thermal fusion by the thermal seal head 26. The package paper 22 comparted into each pack is next cut by the cutter 29, and conveyed in an upper left direction (as one faces the figure) to the take-out port 32 by the conveyor 31.

Figure 4:
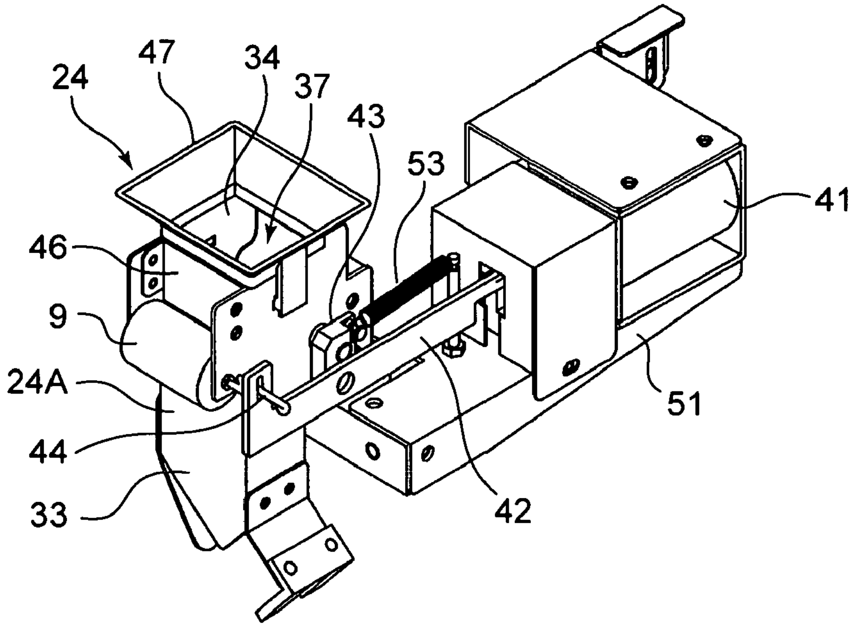
FIG. 4 is a perspective view of components around a nozzle of the medicine supplying apparatus shown in FIG. 1 (Embodiment 1)
Figure 5:
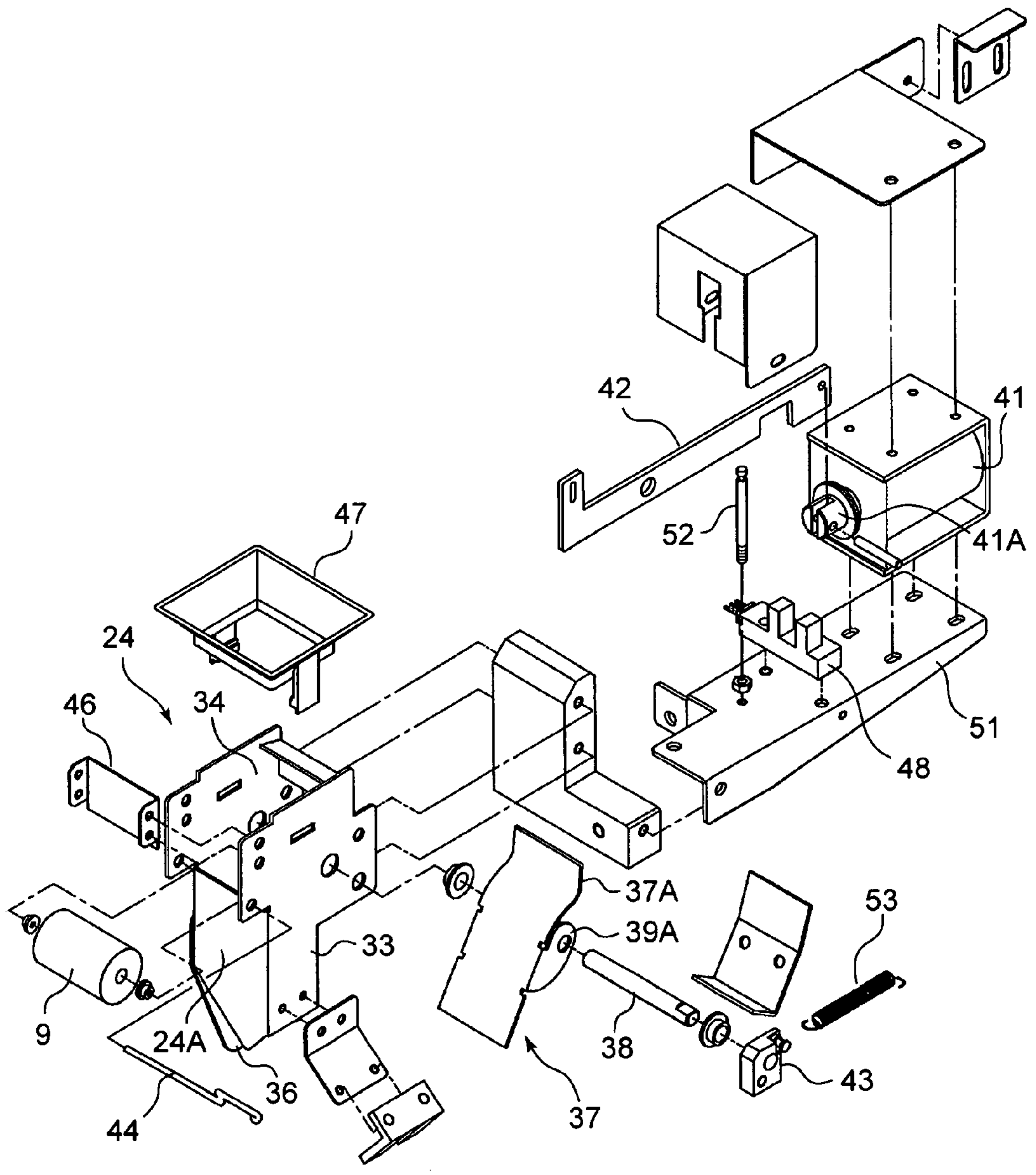
FIG. 5 is an exploded perspective view of each component of FIG. 4.

Next, the nozzle 24 will be described with reference to FIGS. 4 to 9. FIG. 4 is a perspective view of components around the nozzle 24, and FIG. 5 is an exploded perspective view of each component. The nozzle 24 is positioned under the hopper, and substantially vertically disposed. The nozzle 24 has a rectangular cylinder shape whose upper and lower ends are opened. An outlet portion of a tip (lower end) of the nozzle is formed into a narrow portion 33 whose rear wall is brought forwards in a stair form in such a manner that a forward/backward dimension of the outlet portion is smaller than that of an upper end on an inlet side. The lower end of the narrow portion 33 opens as an outlet 34A of a medicine falling passage 34 constituted in the nozzle 24.

It is to be noted that the medicine falling passage 34, which is an upper portion of the nozzle 24 in the present embodiment, has a depth inner dimension of, for example, 30 mm, and a depth dimension of the narrow portion 33 is, for example, 21 mm. The package paper 22 having a depth (width) of 74 mm or 43 mm is usually used. The narrow portion 33 is constituted in such a manner that the nozzle 24 can be inserted even into the shallower package paper 22.

Moreover, the narrow portion 33 is provided with a package paper guide 36. The package paper guide 36 has a substantially V sectional shape which is tapered. The guide is directed in such a manner as to cross a travel direction (a direction of a tilt of about 45 degrees from an upper left portion to a lower right portion) of the package paper 22 at right angles, and the guide is positioned on an upstream side (upper left side as one faces the figure) in the travel direction of the package paper 22 (FIG. 3).

Moreover, an upper-end opening of the nozzle 24 faces the lower-end opening of the hopper, and the nozzle 24 is inserted from the lower end of the package paper guide 36 into the package paper 22. In this case, since the package paper guide 36 has the V-shaped section, the guide is easily inserted from the upper-surface opening of the package paper 22 half folded as described above. When the nozzle 24 is inserted into the package paper 22, the package paper swells horizontally with respect to the travel direction by the dimension of the paper in the forward/backward direction. In this case, since the tapered package paper guide 36 is disposed and inserted into the package paper 22, crease or looseness generated in the package paper 22 is prevented or minimized.

When the nozzle 24 is inserted into the package paper 22 in this manner, the medicine received in the hopper is injected into the nozzle 24, then released from the outlet 34A via the medicine falling passage 34 constituted in the nozzle, and injected into the package paper 22. In this case, a bottom portion of the package paper 22 swells by the package paper guide 36. Therefore, even when a large amount of medicine is injected, a disadvantage of the generation of the looseness or the crease is prevented or suppressed.

Furthermore, in the nozzle 24, a secondary shutter 37 is disposed which opens/closes the medicine falling passage 34 in the nozzle 24. This shutter 37 is positioned above the narrow portion 33 in the nozzle 24. The shutter is rotatable centering on a driving shaft (driving shaft for opening/closing the shutter 37) 38 which is positioned above the narrow portion 33 on an inner side of the nozzle 24 and which extends along a horizontal direction (travel direction of the package paper 22). As shown in FIG. 5, the shutter 37 is a plate material having a width which is smaller than an inner dimension of the medicine falling passage 34 in the nozzle 24 in the horizontal direction by a dimension corresponding to a clearance for operation. The driving shaft 38 is inserted and fixed in a through hole 39A of an arm portion 39 extending upwards from a rear surface of a middle portion of the shutter.

Figure 6:
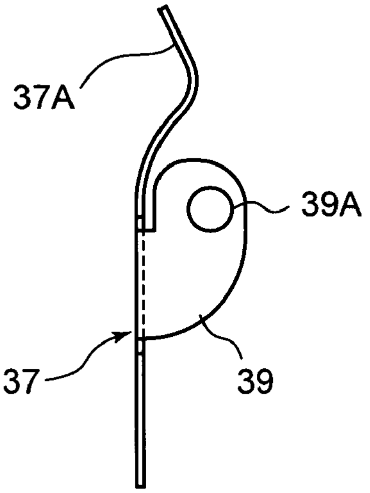
FIG. 6 is a side view of a shutter (secondary shutter) of the medicine supplying apparatus shown in FIG. 1.

Moreover, while a portion of the shutter under the driving shaft 38 hangs down as shown in FIG. 6, a portion of the shutter above the driving shaft 38 is curved backwards at a predetermined curvature as shown, and thereafter continuously bent obliquely upwards and forwards at a smaller curvature. Accordingly, the upper end portion of the shutter 37 above the driving shaft 38 constitutes a pressing portion 37A having such a shape that the portion is smoothly curved backward, and thereafter extends obliquely forwards while extending upwards in a hanging-down state of FIG. 6. It is to be noted that the portion of the shutter under the driving shaft 38 has such a shape that the portion extends downwards in a substantially flat plate shape.

Figure 7:
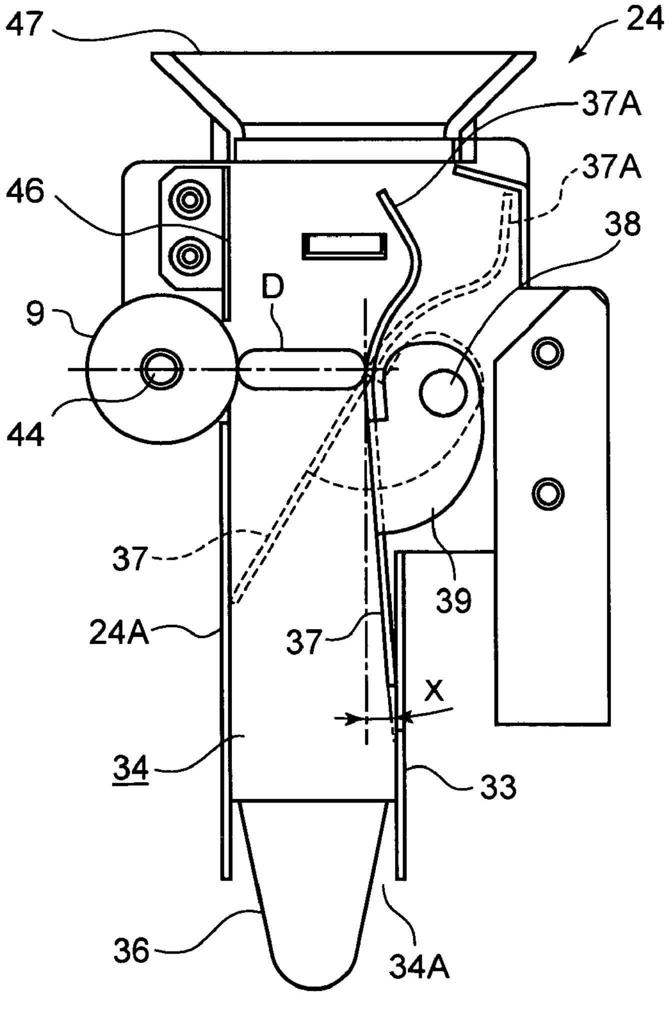
FIG. 7 is a longitudinal side view of the nozzle of the medicine supplying apparatus shown in FIG. 1.

A tip portion (lower end portion) of the shutter 37 extends obliquely downwards from a driving shaft 38 side toward an inner surface of a wall 24A (wall on the front side of the narrow portion 33) on the front side of the nozzle 24 facing the shutter as shown by a broken line in FIG. 7 (in this case, the tip portion of the shutter 37 abuts on or approaches the inner surface of the wall 24A). In this state, the shutter closes the medicine falling passage 34 in the nozzle 24 (closed state). In this case, a tip of the pressing portion 37A is directed substantially upwards. Moreover, when the shutter is rotated counterclockwise centering on the driving shaft 38 in FIG. 7, and brought into a substantially hanging-down state as shown by a solid line in FIG. 7, the shutter 37 opens the medicine falling passage 34 (opened state). In this case, the tip of the pressing portion 37A is directed obliquely in an upper forward direction.

It is to be noted that in this opened state (state shown by a solid line in FIG. 7), the tip portion (lower end portion) of the shutter 37 is rotated until the portion abuts on the inner surface of the wall of the narrow portion 33 on the inner side. In this state, the portion of the shutter under the driving shaft 38 extends obliquely rearwards by a predetermined angle X from the hanging-down state. Accordingly, the shutter 37 is detached from the inner surface of the facing wall 24A toward a tip side (lower end side) of the shutter, and the medicine falling passage 34 broadens while extending downwards.

Furthermore, a roller 9 is attached to the wall 24A of the nozzle 24. This roller 9 is a columnar member having a width which is smaller than a horizontal inner dimension of the medicine falling passage 34 in the nozzle 24 by a clearance dimension for operation. The roller is formed of a material having a large coefficient of surface friction, such as a rubber, and the roller is rotatably attached to the nozzle 24 centering on a horizontal rotation shaft 44 extending as a columnar shaft through the roller. It is to be noted that a plurality of grooves each having a width and a depth in a range of about 0.5 mm to 1 mm are formed in the surface of the roller 9 over an axial direction. Accordingly, the coefficient of surface friction is further increased.

Figure 8:
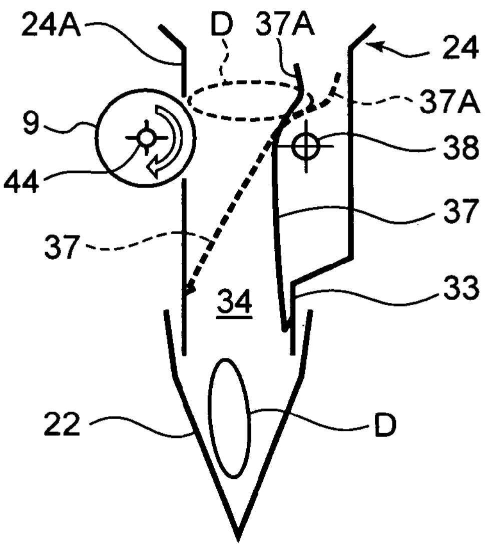
FIG. 8 is another longitudinal side view of the nozzle of FIG. 7 (Embodiment 1)
Figure 9:
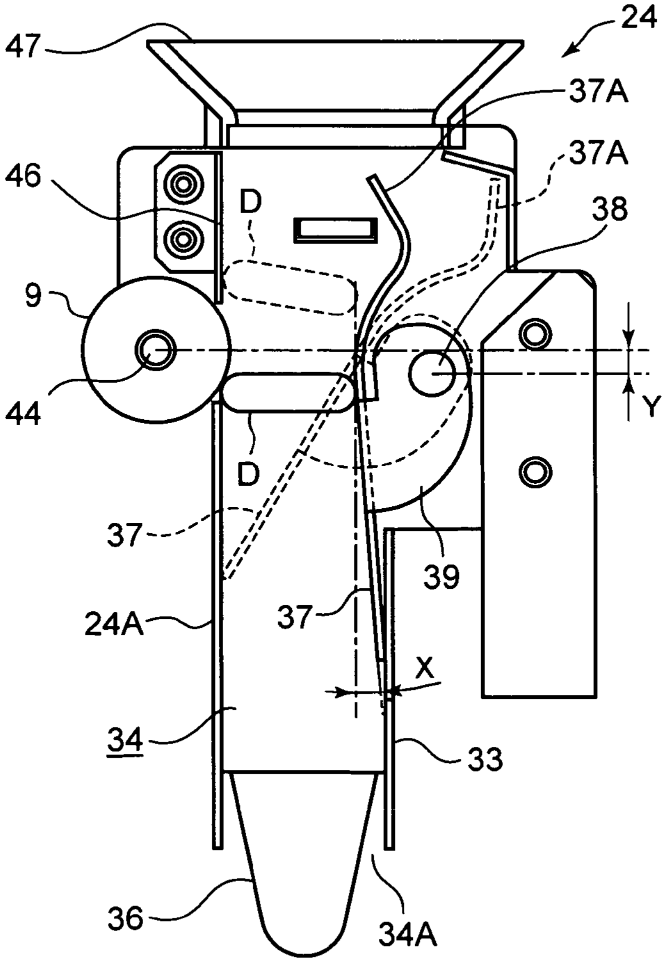
FIG. 9 is another longitudinal side view of the nozzle of FIG. 7.

At this time, the roller 9 is disposed in a position at such a height that the roller faces the shutter 37, protrudes slightly inwards from the wall 24A of the nozzle 24 on the front side, and faces the inside of the medicine falling passage 34 (FIG. 7). The rotation shaft 44 of the roller 9 is disposed in a position shifting upwards from the driving shaft 38 of the shutter 37 by a predetermined dimension Y (FIG. 9). As shown in FIG. 8, the rotation shaft 44 has a height equal to that of the portion of the shutter 37 closest to a wall 24A side in the opened state, and an interval between the shaft and the portion is about 21 mm in the present embodiment. A portion of the roller 9 on the right side (as one faces the figure) of the rotation shaft 44 protrudes from the nozzle 24 to constitute a crank shape.

In FIGS. 4, 5, reference numeral 41 denotes a solenoid for driving the shutter 37 and the roller 9, and the solenoid is attached to a base 51. The driving shaft 38 of the shutter 37 is attached to a link member 43 rotatably attached to an arm 42 attached to a plunger 41A of the solenoid 41, and the rotation shaft 44 of the roller 9 rotatably engages with the tip of the arm 42. A coil spring 53 is extended between a pole 52 attached to the base 51, and the link member 43, and the spring constantly urges the plunger 41A in a protruding direction. Moreover, when the solenoid 41 is energized, and the plunger 41A is drawn in against the coil spring 53, the shutter 37 rotates counterclockwise via the driving shaft 38 in FIG. 7 (the above-described opened state), and the roller 9 is rotated by a predetermined angle clockwise in FIG. 7. When the solenoid 41 is non-energized, and the plunger 41A is protruded by the coil spring 53, the shutter 37 is rotated clockwise in FIG. 7 (the above-described closed state), and the roller 9 is rotated counterclockwise by a predetermined angle in FIG. 7.

It is to be noted that in FIGS. 4 to 9, reference numeral 46 denotes a wall member detachably attached to the nozzle 24 above the roller 9 and which constitutes a part of the wall 24A. After attaching the roller 9, the wall member is attached to the nozzle 24. A part of the roller 9 faces the inside of the medicine falling passage 34 between the wall member 46 and the wall 24A disposed under the wall member. Reference numeral 47 denotes a funnel-shaped frame member attached to an upper end of the nozzle 24. Reference numeral 48 denotes a sensor for detecting the operation of the solenoid 41 to confirm an operative state.

An operation of the medicine supplying apparatus 1 constituted as described above will be described according to the present invention. It is to be noted that when a power supply is turned on, each shutter is assumed to be closed. It is also assumed that in the case storing section of the upper structure 7A, the shelves 2 . . . are stored as described above to which the tablet cases containing predetermined medicines (all tablets other than powdered medicines in the present embodiment) are attached.

When an operator inputs prescription data into the personal computer based on doctor's prescription, a control unit of the medicine supplying apparatus 1 specifies the tablet case containing the designated medicine based on the prescription data, drives the drum motor to rotate the discharging drum, and discharges the medicines one by one. In this case, the discharged medicine (shown by D in FIGS. 7 to 9) is detected and counted by the medicine detecting sensor. Moreover, when a predetermined amount of medicine (one medicine in the embodiment) is discharged, the drum motor is stopped. The discharged medicine D enters the chute constituted by the passage from the discharging chute of the tablet case, and is temporarily received by the primary shutter.

Moreover, the control unit opens the primary shutter to allow the medicine D to fall down into the hopper. The medicine which has fallen into the hopper comes out of the lower-end opening to enter the nozzle 24, and is received on the secondary shutter 37 which is closed as shown by broken lines in FIGS. 7 to 9. Next, the control unit energizes the solenoid 41 to draw inwards the plunger 41A, and rotates the shutter 37 counterclockwise in FIGS. 7 to 9 as described above to bring the shutter into the opened state. In this case, as shown by an arrow in FIG. 8, the roller 9 rotates clockwise by a predetermined angle.

When the shutter 37 is opened, the medicine D falls down through the medicine falling passage 34, and is injected from the outlet 34A into the package paper 22. Moreover, after the medicine is packaged by the packaging machine 13 as described above, the medicine is sent to the outside from the take-out port 32. In this case, since the next medicine is discharged at a time when the medicine D falls down from the primary shutter into the hopper, the control unit shortens a time required in the packaging. It is assumed that the printing concerning the medicine to be packaged is performed by the printer 23 before the medicine is injected.

Here, the medicine D has a length of about 22 mm at most, but there is not a large difference in diameter, and the diameter of the medicine is about 10 mm at maximum. Therefore, the medicine D, which has fallen from the hopper into the nozzle 24, has such a vertical posture that a longitudinal direction of the medicine extends vertically. In this posture, the medicine D is received on and laid along the shutter 37 extended obliquely downwards (closed state) as shown by the broken line of FIG. 7. In this state, when the shutter 37 is rotated and brought into a substantially hanging-down opened state as shown by the solid line in FIG. 7, the medicine D takes a vertical posture in accordance with the rotation of the shutter 37 without any trouble. The medicine falls down as such through the narrow portion 33 (depth of 21 mm), and falls down into the package paper 22.

However, when the medicine falls down from the hopper into the nozzle 24, the medicine has such a transverse posture that the longitudinal direction of the medicine is directed in the horizontal direction as shown by a broken line in FIG. 9. In this case, as shown in FIG. 7, the medicine D is sometimes bridged between the shutter 37 and the roller 9 in the closed state. In this case, in a state in which any roller 9 is not disposed, even if the shutter 37 is rotated into the opened state, the medicine D cannot fall down because the medicine D is bridged between the shutter 37 and the wall 24A. The medicine is stuck in the medicine falling passage 34.

However, in the present invention, the roller 9 is disposed facing the shutter 37, and the roller is rotated clockwise (in a direction in which a portion facing the medicine falling passage 34 is directed down toward the outlet 34A) by a predetermined angle in conjunction with the opening of the shutter 37. Therefore, when the medicine D abuts on the roller 9, and the nozzle 24 is clogged with the medicine as shown in FIG. 7, the medicine D is moved downwards by the rotation of the roller 9 as shown by a solid line in FIG. 9, the posture of the medicine is further changed to the vertical posture, and the medicine falls down. This eliminates the bridged state of the medicine D, and the medicine D falls down through the medicine falling passage 34 in the nozzle 24 without any trouble. Therefore, the clogging of the nozzle 24 with the medicine is effectively eliminated, and the medicine can smoothly fall down.

Especially, since a center position between the rotation shaft 44 of the roller 9 and the driving shaft 38 of the shutter 37 vertically shifts by the dimension Y as described above, the roller 9 and the shutter 37 are prevented from being locked in immobile states even in a case where the medicine D takes the transverse posture in the state shown by the solid line in FIG. 9.

Moreover, the shutter 37 is detached from the facing wall surface 24A of the nozzle 24 toward the lower end side in the opened state as described above. Therefore, when the shutter 37 is opened, the medicine falling passage 34 broadens while extending downwards between the shutter 37 and the facing wall 24A of the nozzle 24. Therefore, the medicine D, which falls down through the medicine falling passage 34 by the opening of the shutter 37, is not easily stuck between the shutter 37 brought into the opened state, and the facing wall surface 24A of the nozzle 24. That is, for example, when the medicine D has a length of 17 mm as described above, which is equal to the interval between the roller 9 and the shutter 37, and the medicine D having the transverse posture enters the narrow portion 33, the medicine D can pass through the narrow portion 33 without any trouble, because the lower end of the shutter 37 extends backwards in such a manner as to set the medicine falling passage 34 to be broader than 17 mm. The corresponding portion is not easily clogged.

Here, the medicine D has a length of about 22 mm to 23 mm at most. Therefore, when this large medicine D having the transverse posture falls from the hopper into the nozzle 24, the medicine is sometimes bridged between the pressing portion 37A of the upper end portion of the shutter 37 and the facing inner surface of the wall 24A of the nozzle 24 or the roller 9 as shown by the broken line in FIG. 8.

When the shutter 37 in the closed state is rotated counterclockwise centering on the driving shaft 38 from this state as shown by the broken line in FIG. 8, the pressing portion 37A having the curved shape as described above moves in such a manner as to cover, from above, the end portion (right end as one faces FIG. 8) of the medicine D on a shutter 37 side. The medicine D is accordingly urged downwards. Therefore, even when the shutter 37 is rotated in this case, the shutter 37 does not leap up, and the posture of the medicine D is smoothly changed to the vertical posture and falls down. It is to be noted that when the roller 9 abuts on the left end (as one faces the figure) of the medicine D, the left end of the medicine is moved downwards by the rotation of the roller 9 as described above. Therefore, the transverse posture of the medicine D is smoothly changed to the vertical posture, so that the medicine falls down.

As described above, the roller 9 is rotatably disposed in such a manner as to face the medicine falling passage 34 in the nozzle 24 as described above. Therefore, when the medicine D abuts on the roller 9 and is stuck in the nozzle 24, the posture of the medicine D can be changed by the rotation of the roller 9. Consequently, the nozzle 24 can be effectively prevented from being clogged with the medicine D, and the medicine can smoothly fall down.

Especially, since the coefficient of surface friction of the roller 9 is set to be large, the posture of the medicine D which abuts on the roller 9 can be securely changed by the rotation of the roller 9, and the nozzle 24 can be further securely prevented from being clogged with the medicine. It is to be noted that the solenoid 41 is non-energized a predetermined time after energized, the plunger 41A is drawn out by the coil spring 53, and the shutter 37 is closed.

Embodiment 2

Figure 10:
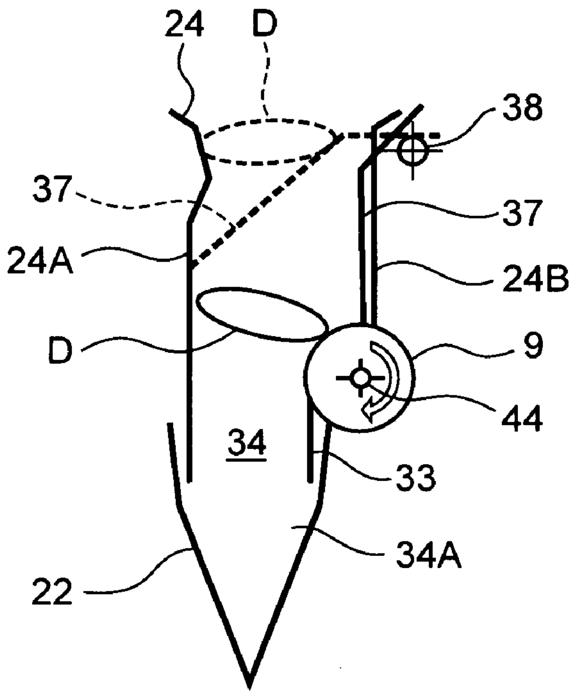
FIG. 10 is a longitudinal side view of a nozzle according to another embodiment of the medicine supplying apparatus of the present invention (Embodiment 2)

Next, FIG. 10 shows a section of a nozzle 24 according to another embodiment of the present invention. In this case, a roller 9 is attached to a position where a narrow portion 33 starts from an inner-side wall 24B of the nozzle 24, that is, a position where a medicine falling passage 34 narrows, and a part of the roller 9 faces the inside of the medicine falling passage 34. Moreover, when a shutter 37 is rotated (opened) counterclockwise centering on a driving shaft 38 by a solenoid 41 in FIG. 10, the roller 9 is rotated by a predetermined angle counterclockwise in FIG. 10. When the shutter 37 is rotated (closed) clockwise, the roller 9 is rotated by a predetermined angle clockwise as shown by an arrow in FIG. 10.

Moreover, when the shutter 37 is opened, a medicine D falls down which maintaining its transverse posture, and the medicine is bridged and stuck between a wall 24A of the nozzle 24 and the roller 9 as shown in FIG. 10, the roller 9 rotates clockwise as shown by the arrow in conjunction with an operation to close the shutter 37. Therefore, a portion (right end as one faces the figure) of the medicine D on a roller 9 side is lifted up by the roller 9, and the posture is changed to the vertical posture. Accordingly, even in the nozzle in which the narrow portion 33 is formed, since the medicine D taking the vertical posture can enter the narrow portion 33, the medicine D is released from the outlet 34A and injected into the package paper 22 without any trouble.

Embodiment 3

Figure 11:
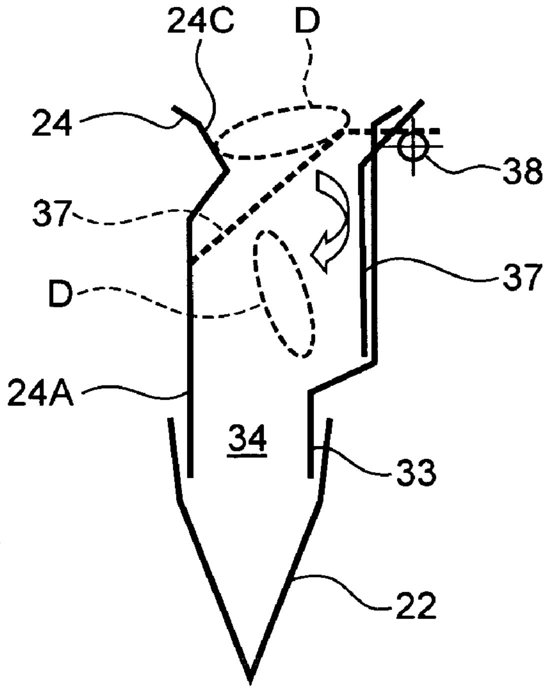
FIG. 11 is a longitudinal side view of a nozzle of another medicine supplying apparatus according to the present invention (Embodiment 3).

Next, FIG. 11 shows a section of a nozzle 24 of a medicine supplying apparatus 1 according to another embodiment of the present invention. In this case, any roller 9 is not disposed. Instead, a protruding portion 24C extending toward a shutter 37 side is formed on a wall surface 24A of the nozzle 24 which faces an upper portion (having a height substantially equal to that of a driving shaft 38) of a shutter 37. An upper surface of the protruding portion 24C smoothly tilts down toward the shutter 37 (inwards).

According to the constitution, in a state in which the shutter 37 is closed as shown by a broken line in FIG. 11, when a large medicine D is bridged and stopped between the protruding portion 24C and the shutter 37, the shutter 37 is opened, and a portion of the medicine D on a wall 24A side is supported by the protruding portion 24C. Accordingly, the medicine D falls down from the shutter 37 side. Accordingly, the posture of the medicine D is changed to the vertical posture, the medicine falls down through a medicine falling passage 34 in the nozzle 24 via the opened shutter 37, and a disadvantage that the nozzle 24 is clogged is eliminated.

It is to be noted that the present invention is applied to a medicine supplying apparatus provided with a packaging machine for packing a medicine in a package paper in the above-described respective embodiments, but the present invention is not limited to the embodiment, and the present invention is also effective for a medicine supplying apparatus which injects a medicine from a nozzle into a container such as a bottle.

What is claimed is:

1. A medicine supplying apparatus for supplying a medicine discharged from a tablet case which contains the medicine, comprising:

a nozzle for releasing the medicine discharged from the tablet case said nozzle being defined in part by an inner side and an opposing front side; a shutter which is rotatably disposed in the nozzle at said inner side and which opens/closes a medicine falling passage in the nozzle; and a roller which is rotatably disposed at said front side facing and extending into the medicine falling passage in the nozzle.

2. The medicine supplying apparatus according to claim 1, wherein the roller is disposed in a position at such a height that the roller faces the shutter, and the roller rotates in conjunction with the opening/closing of the shutter.

3. The medicine supplying apparatus according to claim 1, wherein the medicine falling passage in the nozzle is narrowed on an exit side, the roller is disposed in a position where the medicine falling passage narrows, and the roller rotates in conjunction with the opening/closing of the shutter.

4. The medicine supplying apparatus according to any one of claims 1 to 3, wherein a coefficient of friction of the surface of the roller is increased.

5. A medicine supplying apparatus for supplying a medicine discharged from a tablet case which contains the medicine, comprising:

a nozzle for releasing the medicine discharged from the tablet case; and a shutter which is rotatably disposed in the nozzle and which opens/closes a medicine falling passage in the nozzle by rotation about a driving shaft, wherein the shutter is a single rigid plate having a lower end portion and a middle portion, with said driving shaft being disposed near said middle portion, and the shutter extends from a driving shaft side to a facing wall surface of the nozzle facing the shutter to close the medicine falling passage in the nozzle, the shutter is rotated into a substantially hanging-down state to open the medicine falling passage, and the shutter is detached from the facing wall surface of the nozzle toward a lower end side in an opened state of the medicine falling passage.

6. A medicine supplying apparatus for supplying a medicine discharged from a tablet case which contains the medicine, comprising:

a nozzle for releasing the medicine discharged from the tablet case; and a shutter which is rotatably disposed in the nozzle and which opens/closes a medicine falling passage in the nozzle by rotation about a driving shaft, wherein the shutter is a single rigid plate having a lower end portion, a middle portion and an upper end portion, with said driving shaft being disposed near said middle portion, and the lower end portion of the shutter extends obliquely downwards from a driving shaft side to close the medicine falling passage in the nozzle, the shutter is rotated into a substantially hanging-down state to open the medicine falling passage, and the upper end portion of the shutter is formed into such a shape that the medicine is urged downwards by the rotation for opening the shutter.

7. A medicine supplying apparatus for supplying a medicine discharged from a tablet case which contains the medicine, comprising:

a nozzle for releasing the medicine discharged from the tablet case; and a shutter which is rotatably disposed in the nozzle and which opens/closes a medicine falling passage in the nozzle by rotation about a driving shaft, wherein the shutter is a single rigid plate having a lower end portion and a middle portion, with said driving shaft being disposed near said middle portion, and the shutter extends from a driving shaft side to a facing wall surface of the nozzle facing the shutter to close the medicine falling passage in the nozzle, the shutter is rotated into a substantially hanging-down state to open the medicine falling passage, and a protruding portion extending toward the shutter is formed on the facing wall surface of the nozzle.

8. A medicine supplying apparatus for supplying a medicine discharged from a tablet case which contains the medicine, comprising:

a nozzle for releasing the medicine discharged from the tablet case;

a shutter which is rotatably disposed in the nozzle and which opens/closes a medicine falling passage in the nozzle; and a roller which is rotatably disposed facing the medicine falling passage in the nozzle, wherein said roller is disposed in a position where the medicine falling passage in the nozzle narrows when the shutter is opened, and the roller rotates in conjunction with the opening of the shutter, the shutter is a single rigid plate and the shutter is opened and closed by a driving shaft.

* * * * *